United States Patent
Kim et al.

(10) Patent No.: US 12,266,352 B2
(45) Date of Patent: Apr. 1, 2025

(54) NATURAL LANGUAGE PROCESSING DEVICE

(71) Applicant: LG ELECTRONICS INC., Seoul (KR)

(72) Inventors: Taejoon Kim, Seoul (KR); Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 249 days.

(21) Appl. No.: 17/759,353

(22) PCT Filed: Mar. 6, 2020

(86) PCT No.: PCT/KR2020/003190
§ 371 (c)(1),
(2) Date: Jul. 22, 2022

(87) PCT Pub. No.: WO2021/177495
PCT Pub. Date: Sep. 10, 2021

(65) Prior Publication Data
US 2023/0054251 A1   Feb. 23, 2023

(51) Int. Cl.
*G10L 15/18* (2013.01)
*G06F 40/295* (2020.01)
(Continued)

(52) U.S. Cl.
CPC .......... *G10L 15/18* (2013.01); *G06F 40/295* (2020.01); *G10L 15/04* (2013.01); *G10L 15/22* (2013.01); *G10L 2015/223* (2013.01)

(58) Field of Classification Search
CPC ......... G10L 15/18; G10L 15/04; G10L 15/22; G10L 2015/223; G10L 2015/228;
(Continued)

(56) References Cited

U.S. PATENT DOCUMENTS

| 10,448,115 B1 | 10/2019 | Jamal et al. |
| 2003/0088399 A1* | 5/2003 | Kusumoto ........... H04N 21/482 |
| | | 704/E15.044 |

(Continued)

FOREIGN PATENT DOCUMENTS

| KR | 1020030036092 | 5/2003 |
| KR | 1020100026187 | 3/2010 |

(Continued)

OTHER PUBLICATIONS

European Patent Office Application Serial No. 20923114.1, Search Report dated Oct. 10, 2023, 4 pages.

(Continued)

*Primary Examiner* — Bhavesh M Mehta
*Assistant Examiner* — Darioush Agahi
(74) *Attorney, Agent, or Firm* — LEE, HONG, DEGERMAN, KANG & WAIMEY

(57) ABSTRACT

A natural language processing device according to an embodiment of the present disclosure may comprise: a memory for storing a first channel named entity dictionary including basic channel names and a synonym of each of the basic channel names; a communication interface for receiving, from a display device, voice data corresponding to a voice instruction uttered by a user; and a processor which: acquires multiple channel names included in electronic program guide information; extracts channel names matching the acquired multiple channel names from the first channel named entity dictionary so as to acquire a second channel named entity dictionary; acquires the intention of a speech of the voice instruction on the basis of text data of the voice data and the second channel named entity dictionary; and transmits the acquired intention of the speech to the display device through the communication interface.

12 Claims, 10 Drawing Sheets

(51) Int. Cl.
*G10L 15/04* (2013.01)
*G10L 15/22* (2006.01)

(58) Field of Classification Search
CPC ... G10L 15/183; G06F 40/295; G06F 40/242; H04N 21/42203; H04N 21/4383; H04N 21/482

See application file for complete search history.

(56) References Cited

U.S. PATENT DOCUMENTS

| | | | |
|---|---|---|---|
| 2010/0257560 A1* | 10/2010 | Fukuda | H04N 7/173 |
| | | | 725/40 |
| 2014/0258293 A1* | 9/2014 | Wong | G06F 16/285 |
| | | | 707/737 |
| 2015/0201246 A1* | 7/2015 | Son | H04N 21/2393 |
| | | | 725/53 |
| 2016/0042733 A1 | 2/2016 | Yuan et al. | |
| 2021/0345005 A1* | 11/2021 | Kim | H04N 21/4532 |

FOREIGN PATENT DOCUMENTS

| KR | 1020100113020 | 10/2010 |
|---|---|---|
| KR | 1020150084520 | 7/2015 |

OTHER PUBLICATIONS

PCT International Application No. PCT/KR2020/003190, International Search Report dated Nov. 17, 2020, 4 pages.

\* cited by examiner

FIG. 13

| | Prior art | Present disclosure |
|---|---|---|
| Dictionary used in NER | Manager of entire channel named entity dictionary | Manager of filtered channel named entity synonym dictionary from EPG information |
| Dictionary size | Default channel name + synonym channel name | Tuned channel name+ synonym of tuned channel name |
| Dictionary size (e.g., Italia) | All EU channels need to be supported. Default channel name (15,000)+ synonym channel name (1.5*n)=about 30,000+α | Tuned channel (about 700)+ synonym channel name (700*n)=about 1,500+ α |
| Support range | All channel names that are technically available | Currently tuned channel name |
| Support range (e.g., Italia) | All EU channel names + synonym | Tuned channel+ synonym |
| Differentiation | Even if 30,000 channel names are not actually tuned, they are used to analyze intention-> NLP performance degraded | Only channel name of tuned channel is used for intention analysis. Other channel names are used for intention analysis such as general search |

NATURAL LANGUAGE PROCESSING DEVICE

CROSS-REFERENCE TO RELATED APPLICATION(S)

This application is the National Stage filing under 35 U.S.C. 371 of International Application No. PCT/KR2020/003190, filed on Mar. 6, 2020, the contents of which are all incorporated by reference herein in its entirety.

TECHNICAL FIELD

The present disclosure relates to a natural language processing device for processing a natural language.

BACKGROUND ART

Digital TV services using wired or wireless communication networks have been common. The digital TV service may provide various services that are not capable of being provided by an existing analog broadcasting service.

For example, in the case of Internet protocol television (IPTV) and smart TV services, which are types of digital TV services, interactivity is provided to allow a user to actively select a type of a viewing program and a viewing time. IPTV and smart TV services may provide various additional services, such as Internet search, home shopping, and online games based on such interactivity.

Recent TVs provide a voice recognition service that recognizes a voice uttered by a user and performs a function corresponding to voice.

The voice recognition service is based on natural language processing (NLP) intent analysis.

NLP intent analysis is divided into a named entity recognition (NER) stage for recognizing a vocabulary constructed in advance and a classification stage for identifying intent of a sentence. In intent analysis, the NER stage is first performed, and then classification is performed.

For the NER stage, the vocabulary to be recognized is constructed as a dictionary, and this is called an NE dictionary.

Conventionally, a method of listing all types of vocabulary of a channel to be supported in the NE dictionary is used.

However, in this case, a channel name for a channel that is not likely to be actually tuned is included in the NE dictionary, which may degrade named entity recognition (NER) performance.

The channel name for a channel that is not likely to be tuned is used for the intent analysis every time, and thus there is a problem that natural language processing performance is degraded.

DISCLOSURE

Technical Problem

An object of the present disclosure is to provide a natural language processing device for configuring a vocabulary dictionary used to process a natural language in real time.

An object of the present disclosure is to establish a dictionary including vocabularies of a channel that is dynamically required based on a tuned channel list and to use the dictionary in named entity recognition (NER).

Technical Solution

According to an embodiment of the present disclosure, a natural language processing device includes a memory configured to store a first channel named entity dictionary including default channel names and synonyms of the respective default channel names, a communication interface configured to receive voice data corresponding to a voice command uttered by a user from a display device, and a processor configured to acquire a plurality of channel names included in electronic program guide information, to extract channel names matched to the channel names acquired from the first channel named entity dictionary, to acquire a second channel named entity dictionary, to acquire utterance intention of the voice command based on text data of the voice data and the second channel named entity dictionary, and to transmit the acquired utterance intention to the display device through the communication interface.

The natural language processing device may receive voice data and EPG information from the display device and may then acquire the second channel named entity dictionary.

The natural language processing device may acquire the second channel named entity dictionary based on a comparison result between a key value of each of the plurality of channel names acquired from the electronic program guide information and a key value of each of the default channel names included in the first channel named entity dictionary.

Advantageous Effects

According to various embodiments of the present disclosure, only channel names of required channels are established as a dictionary based on electronic program guide to improve performance of intent analysis.

Since it is not necessary to establish a dictionary for channel names of all channels, load of a database may be reduced, and maintenance and repair may be facilitated.

DESCRIPTION OF DRAWINGS

FIGS. 12 and 13 are diagrams for explaining comparison between a conventional art and an embodiment of the present disclosure.

BEST MODE

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, may have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS may be used.

Accordingly, since various applications are freely added or deleted on a general purpose OS kernel, a display device described herein, for example, may perform various user-friendly functions. The display device, in more detail, may be a network TV, Hybrid Broadcast Broadband TV (HBBTV), smart TV, light-emitting diode (LED) TV, organic light-emitting diode (OLED) TV, and so on and in some cases, may be applied to a smartphone.

Figure 1:
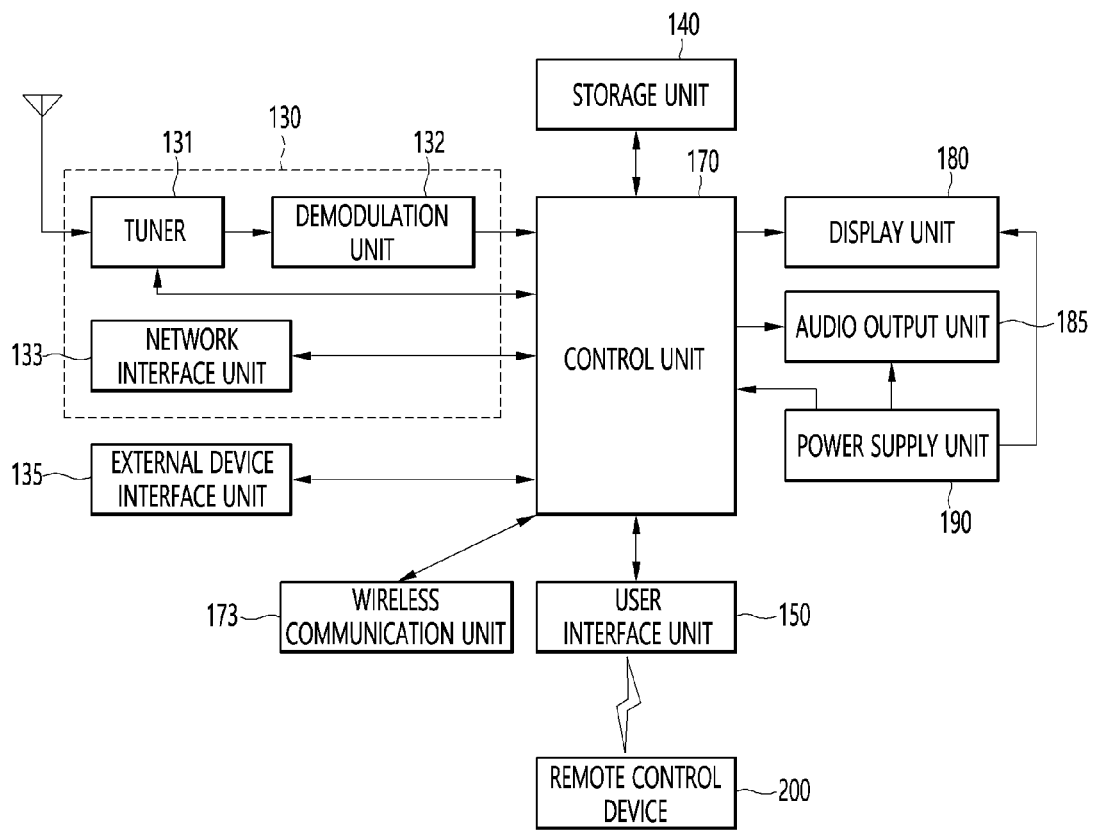
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast receiver 130, an external device interface 135, a storage 140, a user interface 150, a controller 170, a wireless communicator 173, a display 180, an audio output interface 185, and a power supply 190.

The broadcast receiver 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program related data signals and restore the divided video signals, audio signals, and data signals to an output available form.

The external device interface 135 may receive an application or an application list in an adjacent external device and deliver it to the controller 170 or the storage 140.

The external device interface 135 may provide a connection path between the display device 100 and an external device. The external device interface 135 may receive at least one an image or audio output from an external device that is wirelessly or wiredly connected to the display device 100 and deliver it to the controller 170. The external device interface 135 may include a plurality of external input terminals. The plurality of external input terminals may include an RGB terminal, at least one High Definition Multimedia Interface (HDMI) terminal, and a component terminal.

An image signal of an external device input through the external device interface 135 may be output through the display 180. A sound signal of an external device input through the external device interface 135 may be output through the audio output interface 185.

An external device connectable to the external device interface 135 may be one of a set-top box, a Blu-ray player, a DVD player, a game console, a sound bar, a smartphone, a PC, a USB Memory, and a home theater system, but this is just exemplary.

The network interface 133 may provide an interface for connecting the display device 100 to a wired/wireless network including the Internet network. The network interface 133 may transmit or receive data to or from another user or another electronic device through an accessed network or another network linked to the accessed network.

Additionally, some content data stored in the display device 100 may be transmitted to a user or an electronic device, which is selected from other users or other electronic devices pre-registered in the display device 100.

The network interface 133 may access a predetermined webpage through an accessed network or another network linked to the accessed network. That is, the network interface 133 may transmit or receive data to or from a corresponding server by accessing a predetermined webpage through the network.

Then, the network interface 133 may receive contents or data provided from a content provider or a network operator. That is, the network interface 133 may receive contents such as movies, advertisements, games, VODs, and broadcast signals, which are provided from a content provider or a network provider, through network and information relating thereto.

Additionally, the network interface 133 may receive firmware update information and update files provided from a network operator and transmit data to an Internet or content provider or a network operator.

The network interface 133 may select and receive a desired application among applications open to the air, through network.

The storage 140 may store signal-processed image, voice, or data signals stored by a program in order for each signal processing and control in the controller 170.

Additionally, the storage 140 may perform a function for temporarily storing image, voice, or data signals output from the external device interface 135 or the network interface 133 and may store information on a predetermined image through a channel memory function.

The storage 140 may store an application or an application list input from the external device interface 135 or the network interface 133.

The display device 100 may play content files (for example, video files, still image files, music files, document files, application files, and so on) stored in the storage 140 and provide them to a user.

The user interface 150 may deliver signals input by a user to the controller 170 or deliver signals from the controller 170 to a user. For example, the user interface 150 may receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user interface 150 may deliver, to the controller 170, control signals input from local keys (not shown) such as a power key, a channel key, a volume key, and a setting key.

Image signals that are image-processed in the controller 170 may be input to the display 180 and displayed as an image corresponding to corresponding image signals. Additionally, image signals that are image-processed in the controller 170 may be input to an external output device through the external device interface 135.

Voice signals processed in the controller 170 may be output to the audio output interface 185. Additionally, voice signals processed in the controller 170 may be input to an external output device through the external device interface 135.

Besides that, the controller 170 may control overall operations in the display device 100.

Additionally, the controller 170 may control the display device 100 by a user command or internal program input through the user interface 150 and download a desired application or application list into the display device 100 in access to network.

The controller 170 may output channel information selected by a user together with processed image or voice signals through the display 180 or the audio output interface 185.

Additionally, according to an external device image playback command received through the user interface 150, the controller 170 may output image signals or voice signals of an external device such as a camera or a camcorder, which are input through the external device interface 135, through the display 180 or the audio output interface 185.

Moreover, the controller 170 may control the display 180 to display images and control broadcast images input through the tuner 131, external input images input through the external device interface 135, images input through the network interface, or images stored in the storage 140 to be displayed on the display 180. In this case, an image displayed on the display 180 may be a still image or video and also may be a 2D image or a 3D image.

Additionally, the controller 170 may play content stored in the display device 100, received broadcast content, and external input content input from the outside, and the content may be in various formats such as broadcast images, external input images, audio files, still images, accessed web screens, and document files.

Moreover, the wireless communicator 173 may perform a wired or wireless communication with an external electronic device. The wireless communicator 173 may perform short-range communication with an external device. For this, the wireless communicator 173 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communicator 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communicator 173 may detect (or recognize) a communicable wearable device around the display device 100. Furthermore, if the detected wearable device is a device authenticated to communicate with the display device 100, the controller 170 may transmit at least part of data processed in the display device 100 to the wearable device through the wireless communicator 173. Accordingly, a user of the wearable device may use the data processed in the display device 100 through the wearable device.

The display 180 may convert image signals, data signals, or on-screen display (OSD) signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component or one component may be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface 133 or the external device interface 135 and play them without including the tuner 131 and the demodulator 132.

For example, the display device 100 may be divided into an image processing device such as a set-top box for receiving broadcast signals or contents according to various network services and a content playback device for playing contents input from the image processing device.

In this case, an operating method of a display device according to an embodiment of the present disclosure described below may be performed by one of the display device described with reference to FIG. 1, an image processing device such as the separated set-top box, and a content playback device including the display 180 and the audio output interface 185.

Figure 2:
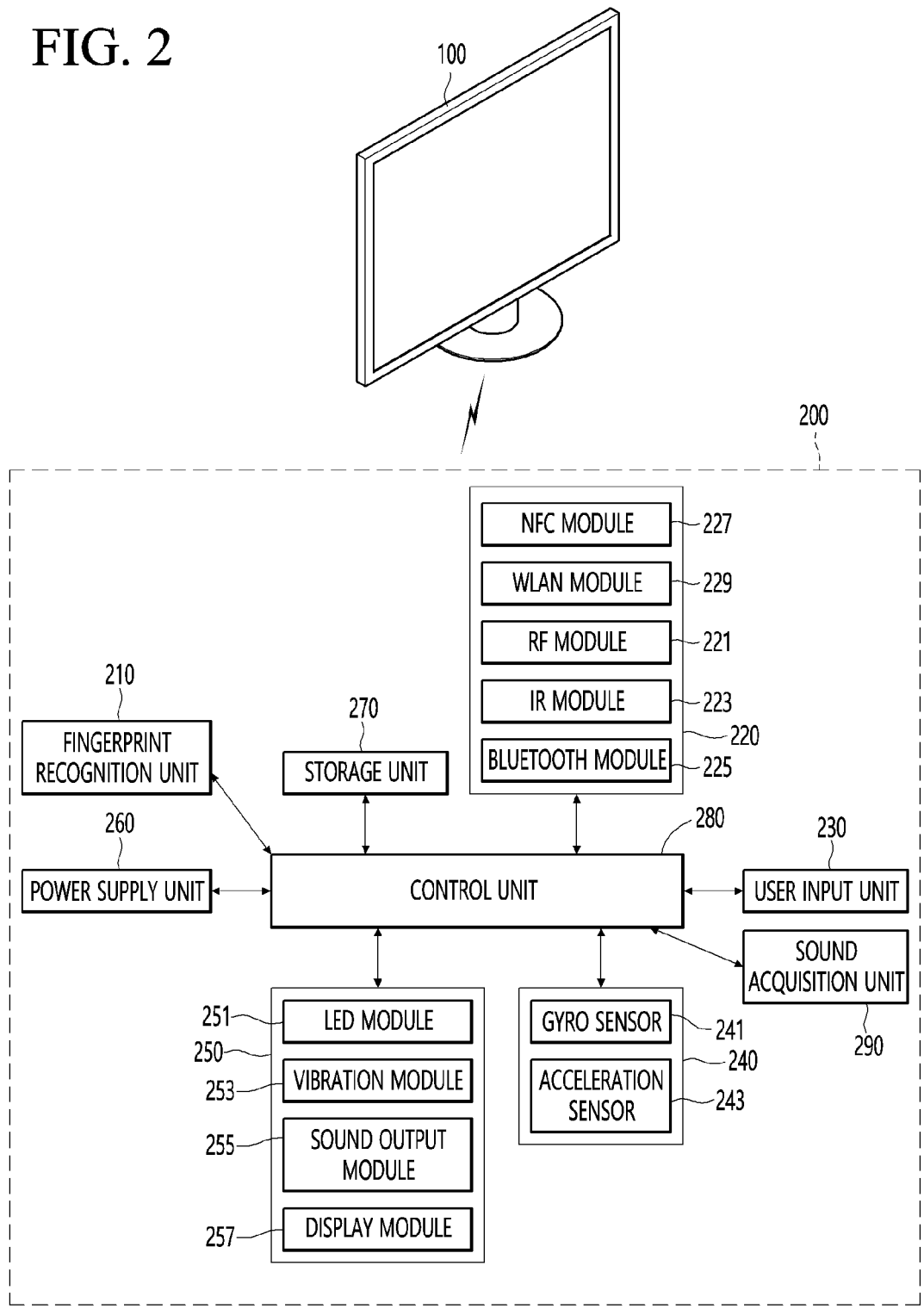
FIG. 2 is a block diagram illustrating a remote control device according to an embodiment of the present disclosure.
Figure 3:
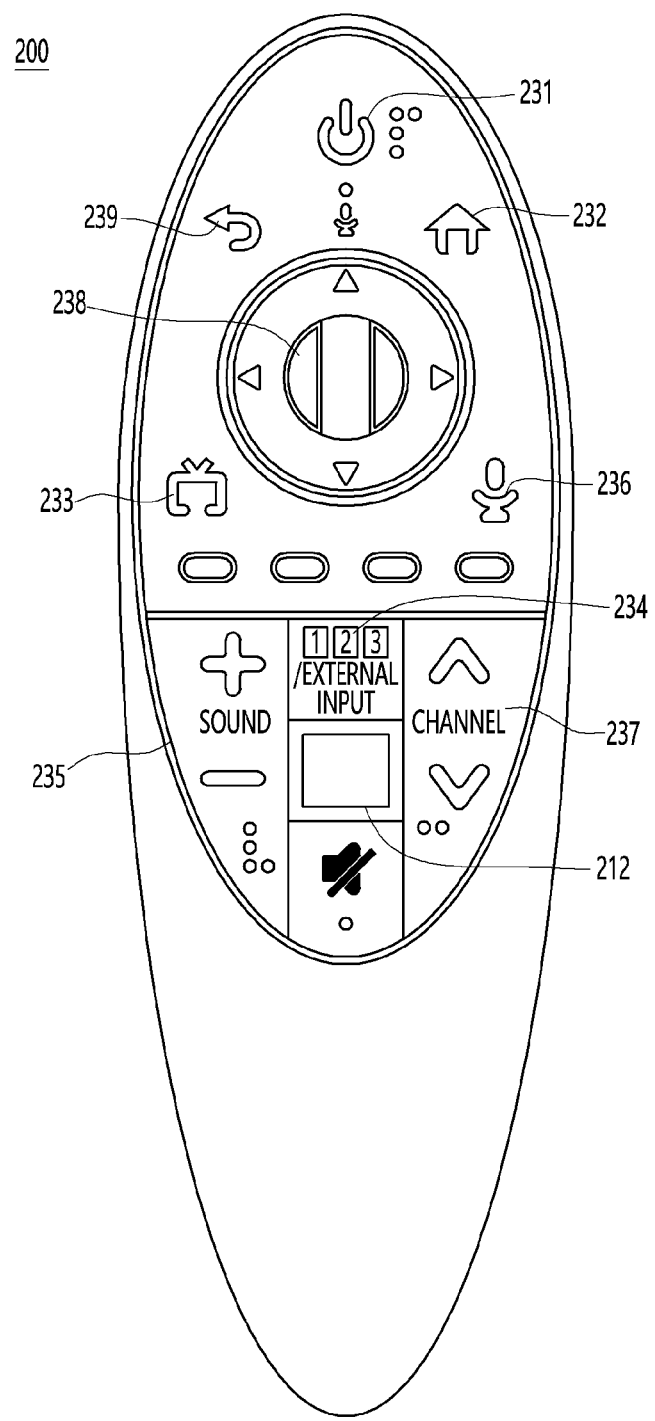
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognizer 210, a wireless communicator 220, a user input interface 230, a sensor 240, an output interface 250, a power supply 260, a storage 270, a controller 280, and a sound acquirer 290.

Referring to FIG. 2, the wireless communicator 220 transmits/receives signals to/from an arbitrary any one of display devices according to the above-mentioned embodiments of the present disclosure.

The remote control device 200 may include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standards. Additionally, the remote control device 200 may include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 may transmit signals containing information on a movement of the remote control device 200 to the display device 100 through the wireless communicator 220.

Moreover, the remote control device 200 may receive signals transmitted from the display device 100 through the RF module 221 and if necessary, may transmit a command on power on/off, channel change, and volume change to the display device 100 through the IR module 223.

The user input interface 230 may be configured with a keypad button, a touch pad, or a touch screen. A user may manipulate the user input interface 230 to input a command relating to the display device 100 to the remote control device 200. If the user input interface 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The voice adjustment button 235 may be a button for adjusting the size of a volume output from the display device 100. The voice recognition button 236 may be a button for receiving user's voice and recognizing the received voice. The channel change button 237 may be a button for receiving broadcast signals of a specific broadcast channel. The check button 238 may be a button for selecting a specific function and the back button 239 may be a button for returning to a previous screen.

Again, FIG. 2 will be described.

If the user input interface 230 includes a touch screen, a user may touch a soft key of the touch screen to input a command relating to the display device 100 to the remote control device 200. Additionally, the user input interface 230 may include various kinds of input means manipulated by a user, for example, a scroll key and a jog key, and this embodiment does not limit the scope of the present disclosure.

The sensor 240 may include a gyro sensor 241 or an acceleration sensor 243 and the gyro sensor 241 may sense information on a movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor and sense a distance with respect to the display 180 of the display device 100.

The output interface 250 may output image or voice signals in response to manipulation of the user input interface 230 or image or voice signals corresponding to signals transmitted from the display device 100. A user may recognize whether the user input interface 230 is manipulated or the display device 100 is controlled through the output interface 250.

For example, the output interface 250 may include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communicator 220.

Additionally, the power supply 260 supplies power to the remote control device 200 and if the remote control device 200 does not move for a predetermined time, stops the power supply, so that power waste may be reduced. The power supply 260 may resume the power supply if a predetermined key provided at the remote control device 200 is manipulated.

The storage 270 may store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 may store, in the storage 270, information on a frequency band for transmitting/receiving signals to/from the display device 100 paired with the remote control device 200 and refer to it.

The controller 280 controls general matters relating to control of the remote control device 200. The controller 280 may transmit a signal corresponding to a predetermined key manipulation of the user input interface 230 or a signal corresponding to movement of the remote control device 200 sensed by the sensor 240 to the display device 100 through the wireless communicator 220.

Additionally, the sound acquirer 290 of the remote control device 200 may obtain voice.

The sound acquirer 290 may include at least one microphone and obtain voice through the microphone 291.

Then, FIG. 4 will be described.

Figure 4:
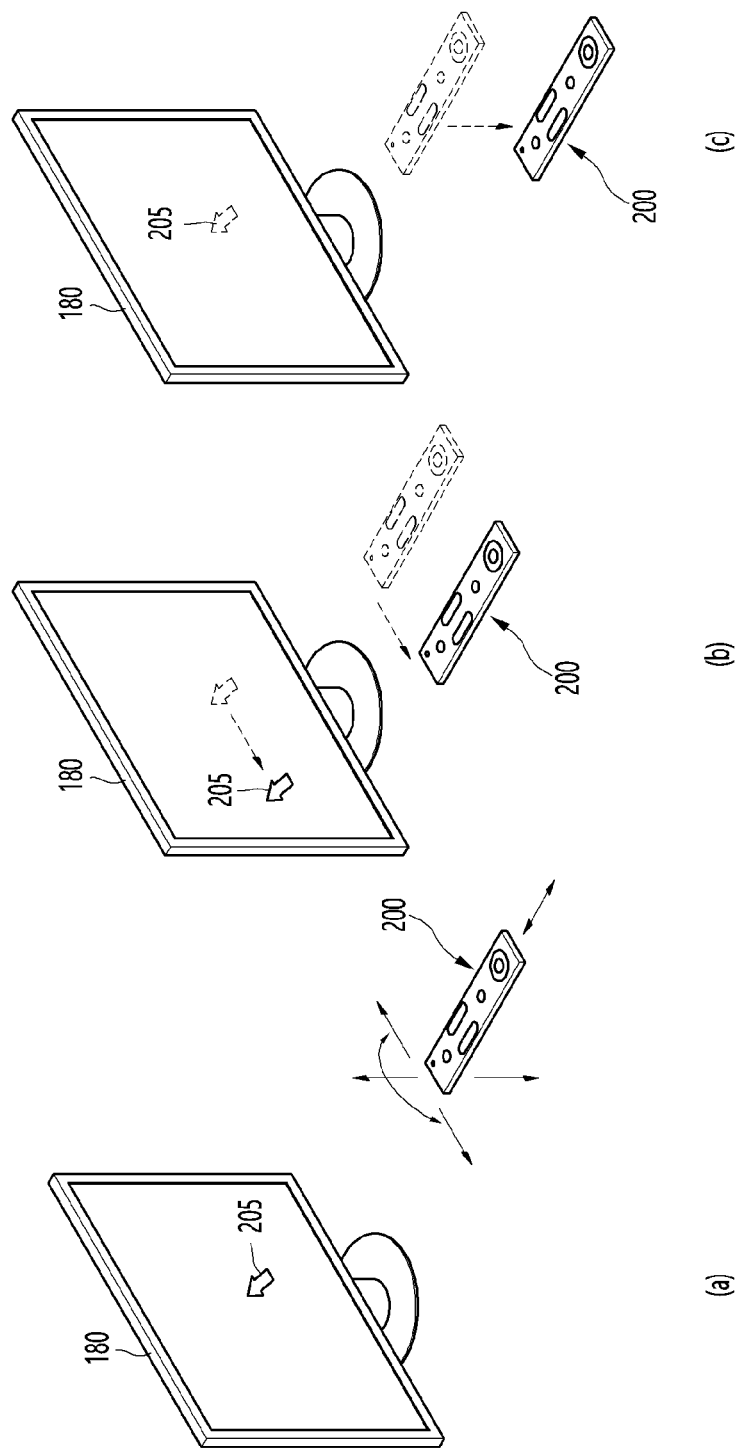
FIG. 4 is a view of utilizing a remote control device according to an embodiment of the present disclosure.

FIG. 4 is a view of utilizing a remote control device according to an embodiment of the present disclosure.

FIG. 4(a) illustrates that a pointer 205 corresponding to the remote control device 200 is displayed on the display 180.

A user may move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(b) illustrates that if a user moves the remote control device 200, the pointer 205 displayed on the display 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(c) illustrates that while a specific button in the remote control device 200 is pressed, a user moves the remote control device 200 away from the display 180. Thus, a selection area in the display 180 corresponding to the pointer 205 may be zoomed in and displayed larger.

On the other hand, if a user moves the remote control device 200 close to the display 180, a selection area in the display 180 corresponding to the pointer 205 may be zoomed out and displayed in a reduced size.

On the other hand, if the remote control device 200 is moved away from the display 180, a selection area may be zoomed out and if the remote control device 200 is moved closer to the display 180, a selection area may be zoomed in.

Additionally, if a specific button in the remote control device 200 is pressed, recognition of a vertical or horizontal movement may be excluded. That is, if the remote control device 200 is moved away from or closer to the display 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

Figure 5:
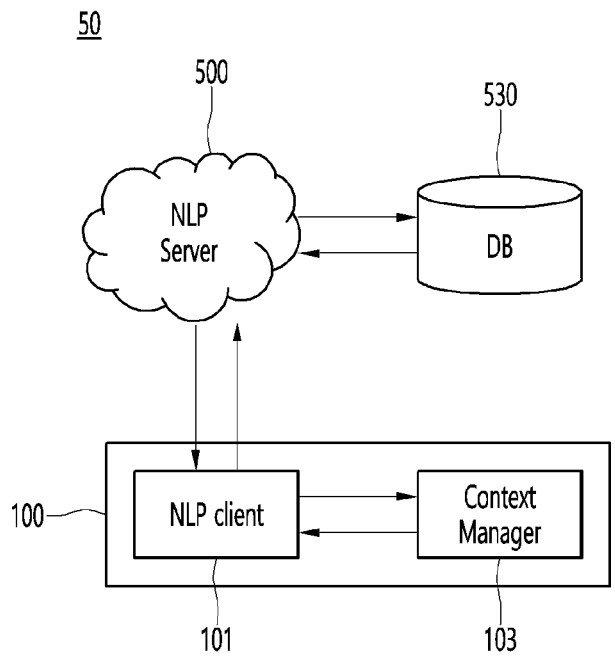
FIG. 5 is a diagram for explaining a configuration of a voice recognition system according to an embodiment of the present disclosure.

FIG. 5 is a diagram for explaining a configuration of a voice recognition system according to an embodiment of the present disclosure.

Referring to FIG. 5, a voice recognition system 50 may include the display device 100, a natural language processing (NLP) server 500, and a database 530.

The NLP server 500 may be referred to as a natural language processing device.

The display device 100 may transmit voice data corresponding to a voice command uttered by a user and electronic program guide (EPG) information of the display device 100 to the NLP server 500.

The display device 100 may further include the component shown in FIG. 1, and an NLP client 101 and a context manager 103 shown in FIG. 5.

The NLP client 101 may be a communication interface that wirelessly communicates with the NLP server 500.

The NLP client 101 may be included in the network interface 133 of FIG. 1.

The NLP client 101 may transmit the voice command and the EPG information of the display device 100 to the NLP server 500 and may receive utterance intention based on the transmitted information from the NLP server 500.

The context manager 103 may acquire the EPG information of the display device 100 and may transfer the collected EPG information of the display device 100 to the NLP client 101.

The context manager 103 may also be included in the controller 170 of FIG. 1.

The NLP server 500 may analyze utterance intention of the user based on the voice data and EPG information corresponding to the voice command received from the display device 100.

The NLP server 500 may transmit information on the utterance intention containing the analysis result to the NLP client 101 of the display device 100.

The database 530 may store a plurality of pattern commands used to analyze the utterance intention of the voice command.

The database 530 may be included in the NLP server 500.

Figure 6:
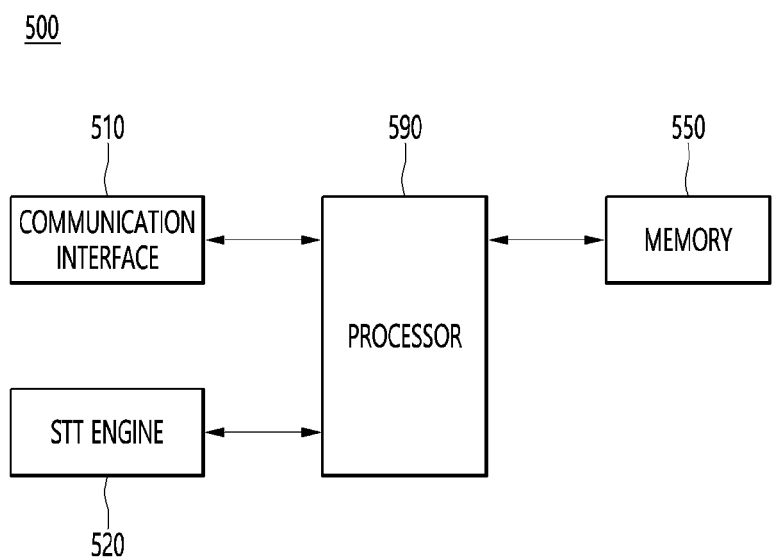
FIG. 6 is a block diagram for explaining a configuration of a NLP server according to an embodiment of the present disclosure.

FIG. 6 is a block diagram for explaining a configuration of a NLP server according to an embodiment of the present disclosure.

Referring to FIG. 6, the NLP server 500 according to an embodiment of the present disclosure may include a communication interface 510, an STT engine 520, a memory 550, and a processor 590.

The communication interface 510 may communicate with the display device 100 or an external server.

The communication interface 510 may provide an interface for connection with a wired/wireless network including the Internet. The communication interface 510 may transmit or receive data to or from the display device 100 or other electronic devices through the connected network or another network linked with the connected network.

The STT engine 520 may convert the voice data corresponding to the voice command of the user into text data. The STT engine 520 may also be configured separately from the NLP server 500.

The memory 550 may store an NER dictionary for named entity recognition (NER).

The memory 550 may store a channel named entity dictionary including basic channel names extracted from the NER dictionary.

The memory 550 may store a filtered channel named entity dictionary based on the EPG information.

The processor 590 may control the overall operation of the NLP server 500.

The processor 590 may acquire the channel named entity dictionary from the NER dictionary.

The processor 590 may extract the channel names included in the EPG information from the acquired channel named entity dictionary and may acquire the filtered channel named entity dictionary.

The EPG information may be received from the display device 100 and may be pre-stored in the memory 550.

The processor 590 may convert the voice data received from the display device 100 into text data.

The processor 590 may acquire the utterance intention of the user based on channel names extracted from the converted text data and the EPG information.

The processor 590 may transmit the acquired utterance intention of the user to the display device 100 through the communication interface 510.

Hereinafter, with reference to FIG. 7, an operation method of the voice recognition system according to an embodiment of the present disclosure will be described.

Figure 7:
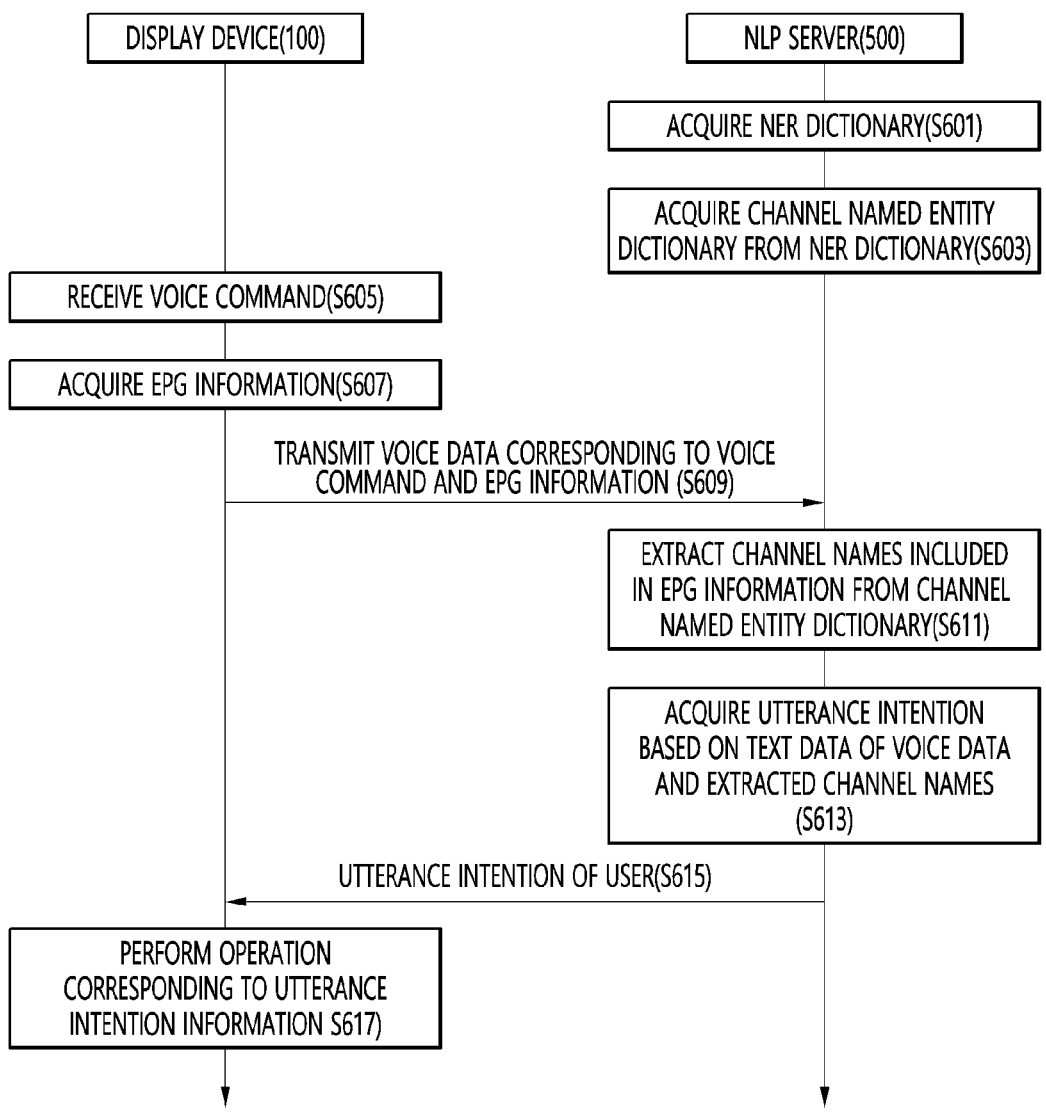
FIG. 7 is a block diagram of an operation method of a voice recognition system according to an embodiment of the present disclosure.

FIG. 7 is a block diagram of an operation method of a voice recognition system according to an embodiment of the present disclosure.

The processor 590 of the NLP server 500 may acquire a named entity recognition (NER) dictionary (S601).

The processor 590 may acquire the NER dictionary from the database 530 shown in FIG. 5.

In another example, the NER dictionary may be a dictionary stored in the memory 550 of the NLP server 500.

The NER dictionary may be a general dictionary used in named entity recognition (NER).

The processor 590 of the NLP server 500 may acquire a channel named entity dictionary from the NER dictionary (S603).

The processor 590 may extract the channel named entity dictionary including names of the channel from the NER dictionary. That is, the channel named entity dictionary may be a dictionary included in the NER dictionary.

The NER dictionary may include vocabularies used in general natural language processing intent analysis.

The channel named entity dictionary may include channel names of channels supported in a plurality of countries and synonyms for the respective channel names. In addition, the channel named entity dictionary may include a channel name of each channel and a synonym for the corresponding channel name.

Then, the controller 170 of the display device 100 may receive a voice command uttered by the user (S605) and may acquire the EPG information (S607).

In the state in which a voice recognition function is activated, the display device 100 may receive the voice command uttered by the user through a microphone included in the display device 100.

When receiving the voice command uttered by the user, the controller 170 may acquire electronic program guide (EPG) information including information on programs provided through the display device 100.

The EPG information may be stored in the storage 140 of the display device 100.

In another example, the EPG information may be pre-stored in the memory 550 of the NLP server 500. In this case, the display device 100 may transmit only the voice data corresponding to the voice command uttered by the user to the NLP server 500.

The controller 170 of the display device 100 may transmit the voice data corresponding to the voice command and the EPG information to the NLP server 500 through the network interface 133 (S609).

The processor 590 of the NLP server 500 may extract channel names included in the received EPG information from the channel named entity dictionary acquired in operation S603 (S611).

The processor 590 may extract a plurality of channel names respectively corresponding to a plurality of channels included in the EPG information.

The EPG information may include information on a plurality of tuned channels. Information on each channel may include a channel name, and a name of a program corresponding to each of a plurality of broadcasting times.

The channel name included in the EPG information may include a space, a special character, and the like. The processor 590 may remove the space or the special character in order to accurately extract the channel name included in the EPG information, which will be described below.

The processor 590 of the NLP server 500 may acquire utterance intention of the user based on text data of the voice data and the extracted channel names (S613).

The processor 590 may convert the voice data into the text data using a speech to text (STT) engine 520. The STT engine 520 may be an engine for converting the voice data into text data.

The STT engine 520 may be included in the NLP server 500 or may be present as a separate component.

When the STT engine 520 is separately configured from the NLP server 500, the NLP server 500 may receive the text data as the conversion result of the voice data from the STT engine.

The processor 590 may analyze the utterance intention of the user based on the text data and the extracted channel names.

For example, when the text data is <Play AAA>, if AAA is present in the extracted channel name, the processor 590 may determine that the utterance intention of the user is intention to play a channel of AAA.

The processor 590 of the NLP server 500 may transmit the acquired utterance intention of the user to the display device 100 through the communication interface 510 (S615).

The processor 590 may transmit the utterance intention including the analysis result of the utterance intention of the user to the display device 100.

The utterance intention may include a control command to perform a specific function of the display device 100 according to intention of the voice command uttered by the user.

The controller 170 of the display device 100 may perform an operation corresponding to the utterance intention received from the NLP server 500 (S617).

Figure 8:
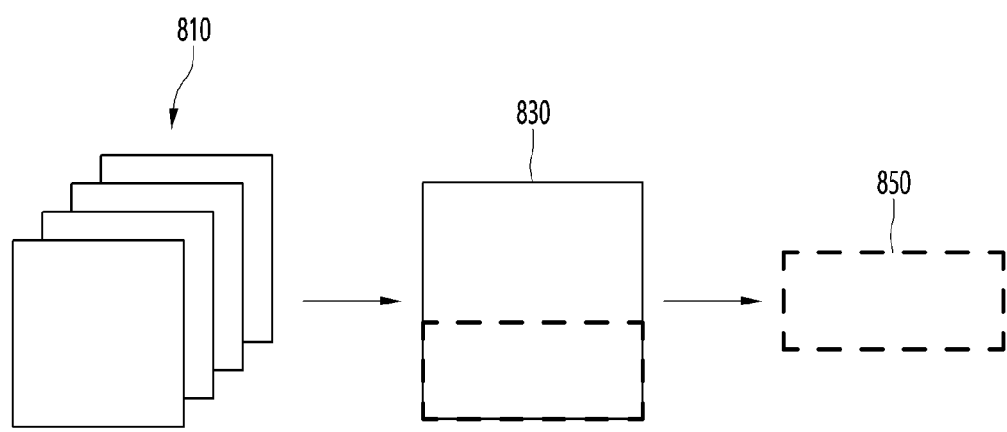
FIG. 8 is a diagram for explaining a process of filtering channel names included in EPG information from an NER dictionary according to an embodiment of the present disclosure.

FIG. 8 is a diagram for explaining a process of filtering channel names included in EPG information from an NER dictionary according to an embodiment of the present disclosure.

FIG. 8 shows an NER dictionary 810. The NER dictionary may be a dictionary including all vocabularies required for named entity recognition (NER).

The processor 590 of the NLP server 500 may extract a channel named entity dictionary 830 including channel manes corresponding to default channels and synonyms of the channel names from the NER dictionary.

For example, when it is required to support all channels of European Union countries, the processor 590 may extract the channel named entity dictionary 830 including respective channel names of European Union countries and synonyms thereof from the NER dictionary 810.

The processor 590 may acquire a filtered channel named entity dictionary 850 from the channel named entity dictionary 830 using the EPG information.

The processor 590 may acquire a plurality of channel names respectively corresponding to a plurality of channels included in the EPG information from the EPG information.

The processor 590 may acquire the filtered channel named entity dictionary 850 by filtering a plurality of channel names acquired from the channel named entity dictionary 830.

The processor 590 may compare respective channel names included in the channel named entity dictionary 830 with channel names acquired from the EPG information, and may add the corresponding channel name to the filtered channel named entity dictionary 850 when the channel names included in the channel named entity dictionary 830 are the same as the channel names acquired from the EPG information.

Figure 9:
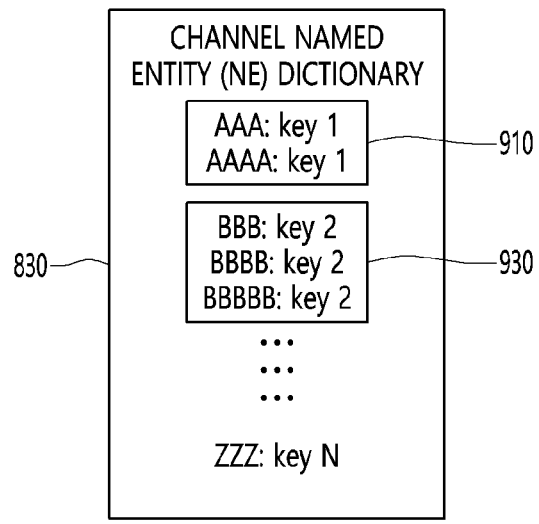
FIG. 9 is a diagram showing an example of a channel named entity dictionary according to an embodiment of the present disclosure.

FIG. 9 is a diagram showing an example of a channel named entity dictionary according to an embodiment of the present disclosure.

FIG. 9 shows channel names included in the channel named entity dictionary 830.

The channel named entity dictionary 830 of FIG. 9 may be a dictionary acquired from the NER dictionary 810.

The channel named entity dictionary 830 may include a plurality of channel groups.

A first channel group 910 may include a channel name AAA, and a synonym AAAA of the channel name AAA. The number of the synonym of the channel name AAA may be one.

The channel name AAA and the synonym AAAA may be matched to the same key. That is, the channel name AAA and the synonym AAAA may be matched to key 1. The key may be an identifier for identifying a channel name and a synonym of the channel name. The key may be expressed by any one of an alphabet, a combination of the alphabet, and a number.

A second channel group 930 may include a channel name BBB and a first synonym BBBB and a second synonym BBBBB of the channel name BBB.

The channel name BBB, the first synonym BBBB, and the second synonym BBBBB may be matched to the same key. That is, the channel name BBB, the first synonym BBBB, and the second synonym BBBBB may be matched to key 2.

As such, the channel named entity dictionary 830 may include a channel name and synonyms of the channel name.

Figure 10:
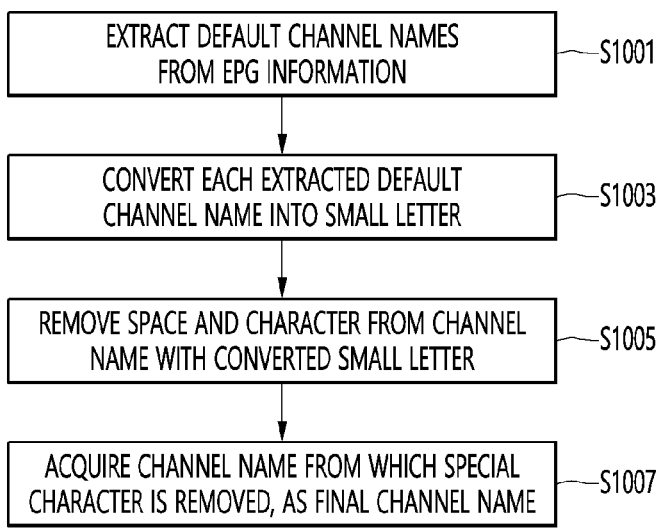
FIG. 10 is a diagram for explaining a process of extracting a channel name from EPG information according to an embodiment of the present disclosure.

FIG. 10 is a diagram for explaining a process of extracting a channel name from EPG information according to an embodiment of the present disclosure.

The processor 590 of the NLP server 500 may extract default channel names from the EPG information (S1001).

The processor 590 may extract a plurality of default channel names for identifying a channel included in the EPG information. The default channel name may be channel information for identifying a channel.

Each default channel name may include a channel name for identifying a channel, a special character, and a space.

The processor 590 may convert each extracted default channel name into a small letter (S1003).

The processor 590 may remove the space and the special character from each channel name converted into a small letter (S1005).

The processor 590 may remove the space and the special character from the channel name converted into the small letter in order to extract a channel name including one or more of a number or an alphabet.

The special character may include <!, $, ?>.

The processor 590 may acquire each channel name from which the space and the special character are removed, as a final channel name (S1007).

The processor 590 may identify acquired plurality of final channel names from the channel named entity dictionary 830 shown in FIG. 9.

It may be assumed that the number of channel groups included in the channel named entity dictionary 830 shown in FIG. 9 is 1,000 and that the number of final channel names acquired from the EPG information is 100.

It may be assumed that each of 100 final channel names acquired from the EPG information is matched to a channel name or a synonym included in the channel named entity dictionary 830.

The processor 590 may filter only 100 channel groups matched to respective 100 final channel names acquired from the EPG information among a plurality of channel groups included in the channel named entity dictionary 830.

As such, the processor 590 may acquire the filtered channel named entity dictionary.

The channel named entity dictionary 830 may be referred to as a first channel named entity dictionary, and the filtered channel named entity dictionary 850 may be referred to as a second channel named entity dictionary.

Later, the filtered channel named entity dictionary may be used to analyze the utterance intention of the voice command uttered by the user.

Figure 11:
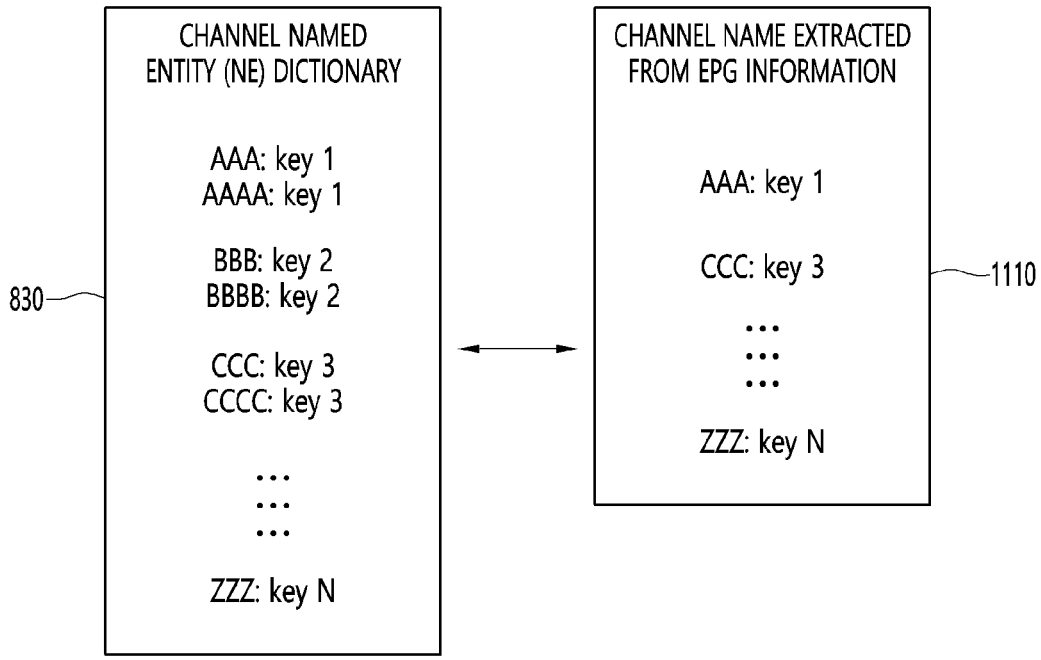
FIG. 11 is a diagram for explaining an example of extracting a channel name included in EPG information from a channel named entity dictionary according to an embodiment of the present disclosure.

FIG. 11 is a diagram for explaining an example of extracting a channel name included in EPG information from a channel named entity dictionary according to an embodiment of the present disclosure.

FIG. 11 shows the channel named entity dictionary 830 and a channel list 1100 including a plurality of channel names extracted from EPG information.

The processor 590 of the NLP server 500 may acquire respective key values of the plurality of channel names extracted from the EPG information.

For example, when a channel name is <AAA>, the processor 590 may acquire a key value of <AAA> as 1, and when the channel name is <CCC>, the processor 590 may acquire a key value of <CCC> as 3.

The processor 590 may extract a channel group corresponding to the same key value as a key value of the channel name extracted from the EPG information.

According to an embodiment of the present disclosure, all channel names included in the channel named entity dictionary 830 may not be used in named entity recognition (NER), and a channel name based on the EPG information may be used in named entity recognition (NER).

That is, a channel named entity dictionary for channel names that are dynamically required may be established, thereby improving performance of named entity recognition (NER).

A channel name of a channel that is not tuned may not be used in intent analysis, and natural language processing performance may be improved.

Figure 12:
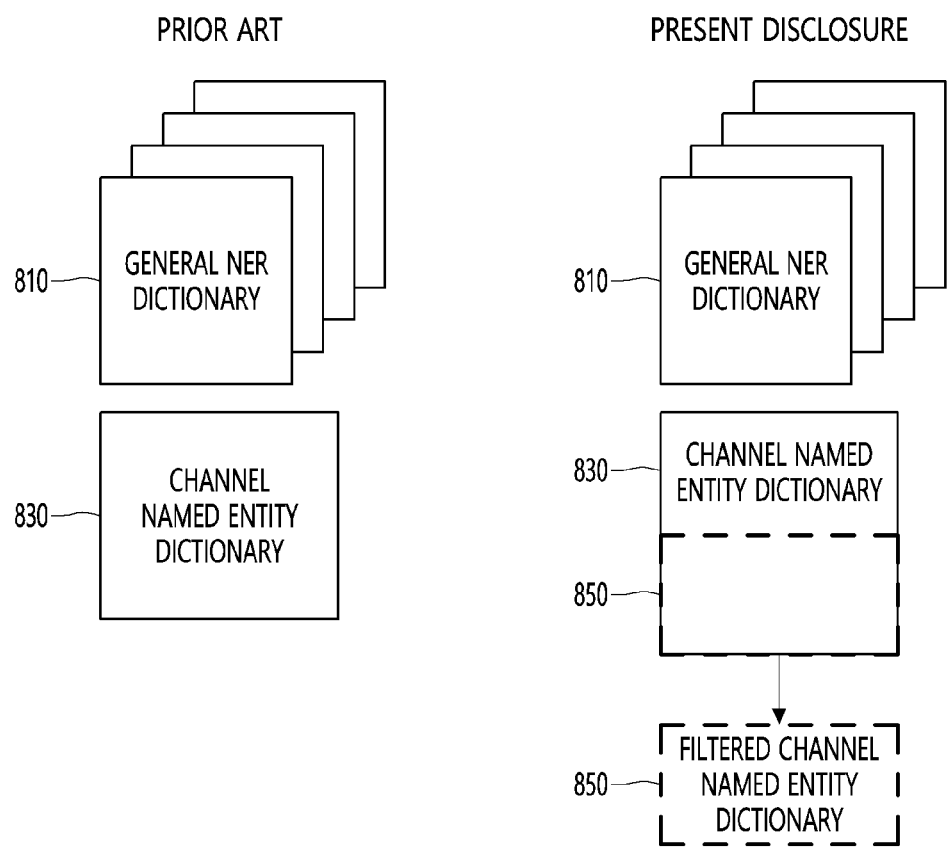

FIGS. 12 and 13 are diagrams for explaining comparison between a conventional art and an embodiment of the present disclosure.

Referring to FIG. 12, conventionally, in order to analyze utterance intention of a voice command uttered by a user, the channel named entity dictionary 830 may be used.

In contrast, according to an embodiment of the present disclosure, in order to analyze the utterance intention of the voice command uttered by the user, the filtered channel named entity dictionary 850 including filtered channel groups from the channel named entity dictionary 830 may be used.

With reference to FIG. 13, a more detailed description will be given.

Conventionally, a dictionary used in NER may be the entire channel named entity dictionary 830. In contrast, a dictionary used in NER according to an embodiment of the present disclosure may be the filtered channel named entity dictionary 850 from the EPG information.

Conventionally, a dictionary has a size containing a plurality of default channel names and synonym channel names of the respective default channel names.

According to an embodiment of the present disclosure, a dictionary may have a size containing channel names corresponding to tuned channels and respective synonym channel names of the corresponding channel names.

The case in which the all EU channels need to be supported will be described as an example. It may be assumed that the number of the all EU default channels is 15,000.

Conventionally, the size of the channel named entity dictionary 830 may correspond to (30,000+a) that is the sum of the number (15,000) of the default channel names and the number (15,000*a) of synonyms of the default channel names. Here, a is a natural number.

According to an embodiment of the present disclosure, the size of the filtered channel named entity dictionary 850 may correspond to (1,500+b) that is the sum of the number (700) of channel names corresponding to tuned channels and the number (700*n) of synonyms of corresponding channel names. Here, b is a natural number.

As such, conventionally, when utterance intention of the voice command uttered by the user is analyzed, vocabularies for all channels, which need to be technically supported, need to be listed in the channel named entity dictionary 830.

In the case of European Union (EU), the number of channels to be supported may be about 15,000. Even if the channels are not actually tuned through the display device 100, the channels need to be technically supported, and thus there is a problem in that the channel named entity dictionary 830 is over fit.

In contrast, according to an embodiment of the present disclosure, the number of channels to be supported may be reduced to the number of tuned channels, and thus a dictionary for channel names may be easily maintained and repaired.

Vocabularies, which are actually tuned in the over fit channel named entity dictionary 830 and are to be uttered as a channel name, may be less than 10% of all vocabularies. That is, vocabularies that are not tuned and synonyms thereof may not be required.

That is, conventionally, even channel names that are not actually uttered by the user may be used for intent analysis every time, and natural language processing performance may be degraded.

In contrast, according to an embodiment of the present disclosure, only channel names for channels that are likely to be actually uttered by the user may be used for intent analysis, and natural language processing performance may be improved.

Conventionally, a support range of a channel for NER is all technically supportable channel names, but according to an embodiment of the present disclosure, a support range of a channel for NER is a channel name currently tuned through the display device 100.

For example, conventionally, a support range of a channel for NER applied to EU may be all channel names of EU and synonyms thereof. According to the present disclosure, a support range of a channel for NER applied to EU may be channel names corresponding to tuned channels and synonyms thereof.

According to an embodiment of the present disclosure, a channel name other than the channel name of the tuned channel may be used for intent analysis indicating general search.

For example, it may be assumed that a user utters a voice command of <Play DDD> and that <DDD> is a channel name corresponding to a tuned channel.

The NLP server 500 may analyze intention of the voice command uttered by the user as asking to tune the current channel to channel <DDD>.

When <DDD> is not a channel name corresponding to tuned channel, the NLP server 500 may analyze intention of the voice command uttered by the user as asking to search for <DDD>.

According to an embodiment of the present disclosure, the above-described method may be implemented as a code to be readable by a processor on a medium in which a program is recorded. Examples of the processor-readable medium include ROM, RAM, CD-ROM, magnetic tape, floppy disk, optical data storage device, etc., and may be implemented in the form of a carrier wave (e.g., transmission over the Internet).

In the display device described above, the configuration and method of the above-described embodiments are not limitedly applicable, but all or some of the embodiments may be selectively combined to make various modifications to the embodiments.

The invention claimed is:

1. A natural language processing device configured to interface with a broadcast receiver configured to receive a plurality of broadcast channels, the natural language processing device comprising:
   a memory configured to store a first channel named entity dictionary including default channel names and synonyms of the respective default channel names from a Named Entity Recognition (NER) dictionary;
   a communication interface configured to receive voice data corresponding to a voice command uttered by a user and electronic program guide information from the broadcast receiver; and
   a processor configured to:
      receive the voice data corresponding to the voice command and the electronic program guide information through the network interface,
      convert the voice data to text data,
      acquire a plurality of first channel names included in the electronic program guide information when receiving the voice data,
      perform a comparison of a key value of each of the default channel names included in the first named entity dictionary and a key value of each of the plurality of the first channel names acquired from the electronic program guide,
      based on the comparison, perform a match analysis to identify any key value of the default channel names acquired from the first channel named entity dictionary that match any key value of the plurality of the first channel names,
      based on matches identified in the match analysis, generate second channel names, a total number of the second channel names being less than a total number of the default channel names,
      generate a second channel named entity dictionary comprising the second channel names, a size of the second channel named entity dictionary being smaller that a size of the first channel named entity dictionary,
      perform an analysis of the text data converted from the voice data and a channel name extracted from the text data based on the second channel named entity dictionary,
      based on the analysis, determine an utterance intention of the voice command, and
      communicate the acquired utterance intention through the communication interface to the broadcast receiver for display on a corresponding display device.

2. The natural language processing device of claim 1, wherein, when the key value of each of the plurality of the first channel names is matched to the key value of each of the default channel names included in the first channel named entity dictionary, the processor adds the default channel name and at least one synonym of the default channel name to the second channel named entity dictionary with the same key value.

3. The natural language processing device of claim 1, wherein the processor converts channel information included in the electronic program guide information into a small letter and acquires the plurality of channel names by removing a space and a special character from the converted small letter.

4. The natural language processing device of claim 1, wherein the processor receives the electronic program guide information from the display device in which the electronic program guide information comprises a channel name and a name of a program corresponding to a plurality of broadcasting times.

5. The natural language processing device of claim 1, wherein the processor includes a speech to text (STT) engine configured to convert the voice data into the text data.

6. The natural language processing device of claim 1, wherein, upon determining the utterance intention of the voice command of the user as asking a tuner of the broadcast receiver to change from an existing channel to a specific channel corresponding to a specific channel name included in the second channel named entity dictionary, the processor generates a tuning command for asking the tuner to tune to the specific channel corresponding to the utterance intention, and transmits the tuning command to the broadcast receiver.

7. The natural language processing device of claim 1, wherein, when a channel name extracted from the text data is not matched to any second channel names of the second channel named entity dictionary, the processor recognizes the utterance intention as a general search command to search the channel name extracted from the text data.

8. An operation method performed by a natural language processing device configured to interface with a broadcast receiver configured to receive a plurality of broadcast channels, the operation method comprising:
acquiring and storing a first channel named entity dictionary including default channel names and synonyms of the respective default channel names from a Named Entity Recognition (NER) dictionary;
receiving voice data corresponding to a voice command uttered by a user and electronic program guide information from the broadcast receiver;
electronically converting the voice data into the text data;
acquiring a plurality of first channel names included in the electronic program guide information when receiving the voice data;
performing a comparison of a key value of each of the default channel names included in the first named entity dictionary and a key value of each of the plurality of the first channel names acquired from the electronic program guide;
based on the comparison, performing a match analysis to identify any key value each of the default channel names acquired from the first channel named entity dictionary that match any key value of the plurality of the first channel names,
based on matches identified in the match analysis, generate second channel names, a total number of the second channel names being less than a total number of the default channel names,
generating a second channel named entity dictionary comprising the second channel names, a size of the second channel named entity dictionary being smaller that a size of the first channel named entity dictionary;
performing an analysis of the text data converted from the voice data and a channel name extracted from the text data based on the second channel named entity dictionary;
based on the analysis, determining an utterance intention of the voice command; and
communicating the acquired utterance intention through the communication interface to the broadcast receiver for display on a corresponding display device.

9. The operation method of claim 8, wherein the acquiring the second channel named entity dictionary includes, when the key value of each of the plurality of the first channel names is matched to the key value of each of the default channel names included in the first channel named entity dictionary, adding the default channel name and at least one synonym of the default channel name to the second channel named entity dictionary with the same key value.

10. The operation method of claim 8, wherein the acquiring the plurality of the first channel names included in the electronic program guide information includes:
converting channel information included in the electronic program guide information into a small letter; and
acquiring the plurality of the first channel names by removing a space and a special character from the converted small letter.

11. The operation method of claim 8, wherein upon determining the utterance intention of the voice command of the user as asking a tuner of the broadcast receiver to change from an existing channel to a specific channel corresponding to a specific channel name included in the second channel named entity dictionary, generating a tuning command for asking the tuner to tune to the specific channel corresponding to the utterance intention and transmitting the tuning command to the broadcast receiver.

12. The operation method of claim 8, further comprising:
when a channel name extracted from the text data is not matched to any second channel names of the second channel named entity dictionary, recognizing the utterance intention as a general search command to search the channel name extracted from the text data.

* * * * *